United States Patent [19]  
Keenan

[11] 4,415,834  
[45] Nov. 15, 1983

[54] TUNGSTEN HALOGEN LAMP CONTAINING CYANOGEN
[75] Inventor: James P. Keenan, Reading, Mass.
[73] Assignee: GTE Products Corporation, Stamford, Conn.
[21] Appl. No.: 46,897
[22] Filed: Jun. 8, 1979
[51] Int. Cl.[3] ............................................. H01K 0/00
[52] U.S. Cl. .................................................. 313/578
[58] Field of Search .................... 313/222 (U.S. only), 313/578–580

[56] References Cited  
U.S. PATENT DOCUMENTS 2,928,977  3/1960  Roth et al. ........................... 313/222  
3,277,330  10/1966  Cooper ................................ 313/222

Primary Examiner—David K. Moore  
Attorney, Agent, or Firm—James Theodosopoulos

[57] ABSTRACT

The gaseous filling of a tungsten halogen lamp includes cyanogen and a halogen or halide.

1 Claim, 1 Drawing Figure

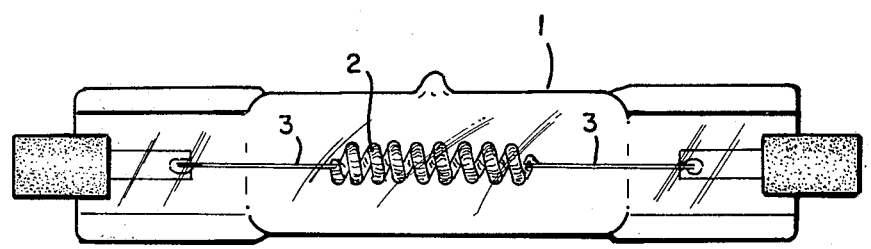

TUNGSTEN HALOGEN LAMP CONTAINING CYANOGEN

THE INVENTION

This invention relates to tungsten halogen lamps. Such lamps are incandescent lamps having a halogen in the gaseous filling.

It is often desirable to incorporate a small amount of carbon in such lamps for its gettering effect, as disclosed in U.S. Pat. Nos. 3,132,278 and 3,418,512 as well as in an article entitled "A Thermodynamical Study of Halogen Lamps With Carbon Additives", published in Journal of Physics D: Applied Physics, 1976, Volume 9, pages 903–912.

An organic halide often serves as the source of halogen in tungsten halogen lamps, as disclosed in U.S. Pat. No. 4,074,168. However, such organic material can provide an undesirable amount of carbon, as disclosed in U.S. Pat. Nos. 3,728,572 and 4,129,348.

Carbon monoxide can be added in the lamp fill, as disclosed in U.S. Pat. Nos. 3,364,376 and 3,728,572, but the amount added can be quite critical, as pointed out in the former patent.

I have found that carbon can be added to the lamp fill as cyanogen, which is a gas at room temperature. Adding the carbonaceous material as a gas overcomes the problem presented when carbon is added in solid form, namely, trying to place the carbon at the proper location. Cyanogen is also preferable to carbon monoxide since, upon dissociation, it forms carbon and nitrogen, a nonreactive gas, instead of carbon and oxygen, a reactive gas.

The drawing shows a tungsten halogen lamp in accordance with this invention. The lamp comprises a sealed envelope 1 having a tungsten filament 2 therein. Lead-in wires 3 are connected to filament 2 and are also connected to external connectors, as is customary. Envelope 1 contains a gaseous filling including cyanogen, an inert gas and a halogen or halide.

In one example for a 1000 watt 120 volt T5 lamp having a vycor envelope, the lamp was filled with a gaseous mixture of 0.66% cyanogen, 6.6% hydrogen bromide and the balance nitrogen to a pressure of two atmospheres. Comparison tests were run on such lamps containing the cyanogen and on identical lamps without the cyanogen. At 120 volts operation the average life for the lamps without cyanogen was 15.8 hours, while the lamps with cyanogen had an average life of 30.0 hours, a 90% increase. At 85 volt operation, the average lives were, respectively 58.6 hours and 288 hours, a 391% increase.

I claim:

1. An incandescent lamp comprising a tungsten filament disposed within a lamp envelope, the lamp envelope containing a gaseous filling including cyanogen and a halogen or halide.

* * * * *